C. F. ECKART.
IMPERVIOUS MULSH FOR REGULATING SOIL WATER.
APPLICATION FILED SEPT. 16, 1916.
1,276,887.
Patented Aug. 27, 1918.
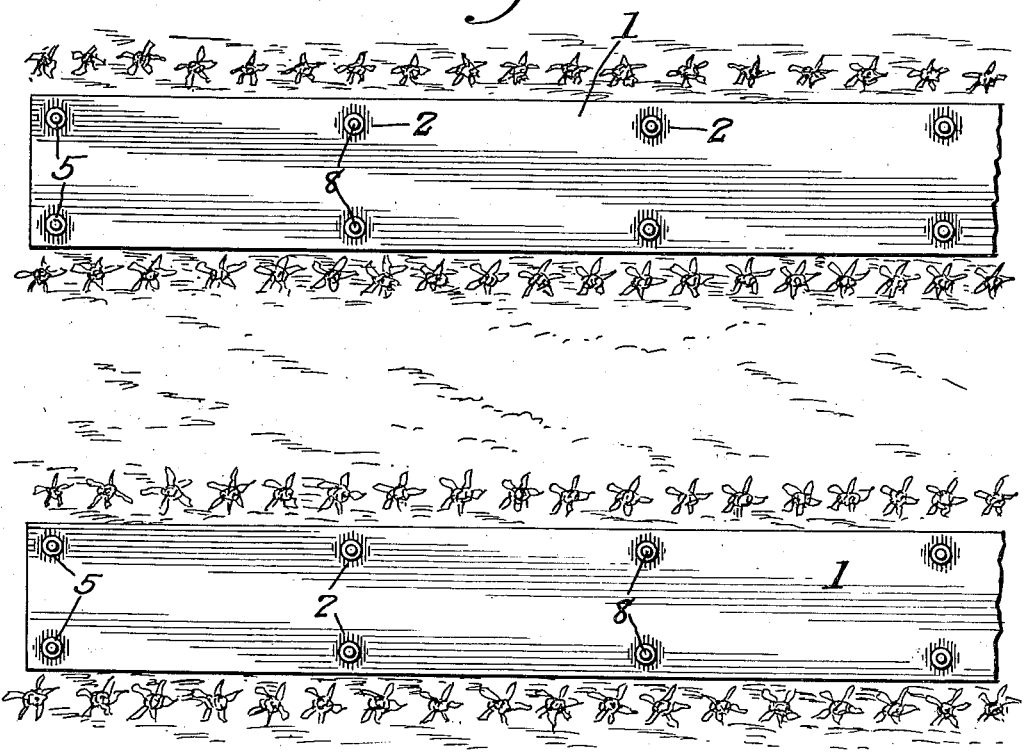
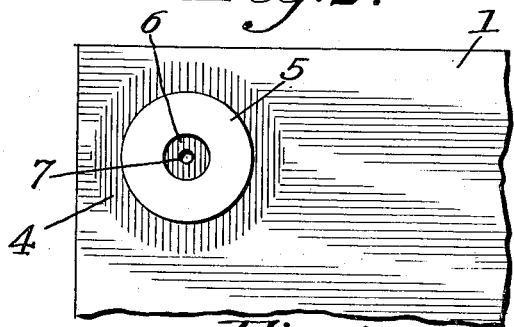
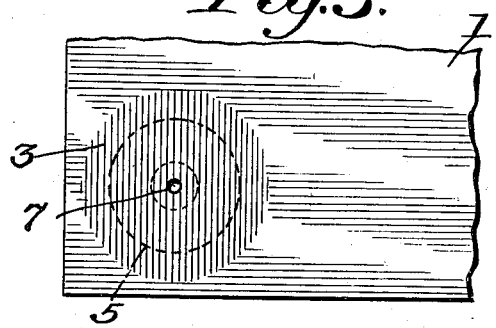
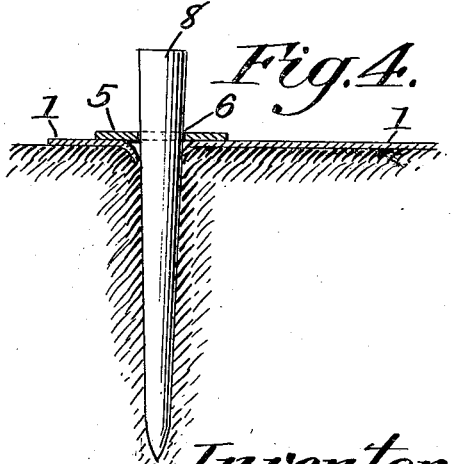
Inventor:
Charles F. Eckart

UNITED STATES PATENT OFFICE.

CHARLES FRANKLIN ECKART, OF OLAA, TERRITORY OF HAWAII.

IMPERVIOUS MULSH FOR REGULATING SOIL-WATER.

1,276,887.   Specification of Letters Patent.   Patented Aug. 27, 1918.

Application filed September 16, 1916. Serial No. 120,470.

*To all whom it may concern:*

Be it known that I, CHARLES F. ECKART, a citizen of the United States, residing at Olaa, Hawaii, Territory of Hawaii, have invented certain new and useful Improvements in Impervious Mulshes for Regulating Soil-Water; and I do hereby declare the following to be a full, clear, and exact description of the invention, such as will enable others skilled in the art to which it appertains to make and use the same.

This invention relates to an impervious mulsh for regulating soil water.

In the raising of plants, especially sugar-cane, the ground often becomes saturated with water. Such a condition is decidedly unfavorable to the roots of the plants, which, in order to function properly, require air as well as moisture, and the required air is largely excluded through the water-logged condition of the soil. Furthermore, if the plants are raised where the rainfall is scarce, sufficient moisture will not be retained in the ground to supply the roots continuously with the proper amount.

It is, therefore, an object of my invention to provide a mulsh which may be placed between the rows of growing plants, so that when the rainfall is heavy or frequent, the soil will not become water-logged, and thus exclude the air from the roots and which, when the rainfall is scanty, will cause sufficient moisture to be retained within the soil to supply the roots of the growing plants properly.

In the drawing:—

Figure 1 is a plan view of a plurality of devices constructed in accordance with my invention showing the same applied between the rows of growing plants;

Fig. 2 is a fragmental plan view of one of the mulshes showing the means for reinforcing the same on the upper side at one of the pegging centers;

Fig. 3 is a similar view looking at the under side of the mulsh; and

Fig. 4 is a sectional view showing the manner in which the mulsh is secured in place between the rows.

The preferred embodiment of my invention includes a strip or body 1 of waterproof, opaque, flexible material, such as paper or fabric, which is of such width that it will extend between and within a short distance of the plants in adjacent rows, as illustrated in Fig. 1. Along each longitudinal edge of the strip is a plurality of spaced pegging centers, which are indicated generally by the reference character 2. Each of these pegging centers includes a coating of water-proof material, such as paint, which is applied to the under side of the strip and is of any desired shape and size and includes also a similar material applied to the upper face of the strip, so that superimposed patches 3 and 4 are formed. Secured to the upper face of the strip and on the patch 4 thereon is an eyelet-like element 5, which is made preferably of the same material of which the strip is made, of less width than the width of the patch 4, and is secured in place by means of a suitable water-proof adhesive, such as rubber cement or the like. This element 5 is provided with a central opening 6 which incloses a relatively smaller hole 7 which extends through the strip.

In using the mulsh, it is placed between the rows of plants, so that its edges terminate within a short distance of the same, and a comparatively long tapered peg 8 is engaged in the hole 7 in each of the pegging centers and is driven through the strip. In passing through the strip, the peg enlarges the hole 7 until the portion of the peg which is located within the element 5 exerts pressure against the edges of the opening 6. At this time, the said element will grip the peg and prevent the relative movement of the strip on the peg. By applying the water-proof material to the strip to form the patches 3 and 4 and by securing the element 5 at each of the pegging centers, the strip is prevented from tearing. This is because of the fact that at each of these centers, the strip is reinforced and the reinforcement gradually increases toward the peg, so that there is no positive point where the tearing action of the strip will be induced. The weakest portions of the mulsh lie outside of the patches 3 and 4, and these portions are not subjected to the strain incident to the engagement of the pegs with the strip.

The mulsh is preferably placed on land which has recently been cultivated and is free, or practically free, from weeds. It is put in position, preferably, when the soil is comparatively dry and it will have a beneficial action on the plants grown in districts where the rainfall is scanty or moderate, because it will cause the soil to retain sufficient moisture to supply the roots of the plants. It may be advantageously used in districts where the rainfall is heavy, and when used in these districts, it will create stretches or zones of relatively dry soil between the rows of plants. For instance, the unmulshed portion of the soil will become saturated during a continuous or heavy rain. This condition of the soil is decidedly unfavorable to the roots of the plants, which, for proper functioning as before mentioned, require air as well as moisture and the required air is excluded, because of the saturation of the soil. Since the mulshed area of the soil is protected from the rains and since the lateral movement of the water in the soil is very slow, it is obvious that, under the conditions described, there must exist a zone which lies between the practically dry soil beneath the mulsh and the water-saturated soil, which contains the proper amount of water for the growing crop. If the rains should be exceedingly heavy and of a torrential nature, the soil under the mulshes would, of course, finally became charged with water. If, after such a condition, a drought should follow, the unmulshed area or zone would, of course, lose its moisture and at this time, the mulshed zone would be protected from evaporation and the water contained in the soil would then be accessible to the roots of the plants, which roots extend beneath the mulshes, and a portion of the water would, by lateral diffusion, reach the roots in the unprotected zone, so as to supply them with water.

What I claim is:—

1. A water-proof, opaque mulsh consisting of a strip having pegging centers formed of a coating of water-proof material, on one side thereof.

2. A water-proof, opaque mulsh consisting of a body having pegging centers formed of a coating of water-proof material on the upper and lower sides thereof.

3. A water-proof, opaque mulsh consisting of a body having pegging centers formed of a coating of water-proof material in one side thereof, and of a reinforcing element on the other side thereof.

4. A water-proof, opaque mulsh consisting of a strip having pegging centers formed of a coating of water-proof material and a reinforcing element.

5. A water-proof, opaque mulsh consisting of a body having superimposed coatings of water-proof material on the sides thereof, and a reinforcing element superimposed on and secured to one of said coatings.

6. A water-proof, opaque mulsh consisting of a strip having pegging centers, each of which includes superimposed coatings of water-proof material, and an eyelet-like reinforcing element superimposed on and secured to one of said coatings.

7. A mulsh consisting of a water-proof, opaque body having pegging centers including an eyelet-like element and a water-proof coating securing the same to the body.

8. A flat mulsh consisting of a water-proof, opaque body having a hole therethrough, and means for gradually reinforcing the body toward the hole.

In testimony whereof I affix my signature.

CHARLES FRANKLIN ECKART.